US007272743B2

(12) United States Patent
Oikawa

(10) Patent No.: US 7,272,743 B2
(45) Date of Patent: Sep. 18, 2007

(54) SEMICONDUCTOR INTEGRATED CIRCUIT

(75) Inventor: Kohei Oikawa, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 438 days.

(21) Appl. No.: 10/934,462

(22) Filed: Sep. 7, 2004

(65) Prior Publication Data

US 2006/0020836 A1 Jan. 26, 2006

(30) Foreign Application Priority Data

Jul. 26, 2004 (JP) ............................ 2004-217873

(51) Int. Cl.
*G06F 1/12* (2006.01)
*G06F 1/04* (2006.01)
*G06F 1/10* (2006.01)
*H04L 7/04* (2006.01)

(52) U.S. Cl. ...................... 713/503; 713/400; 713/401; 713/500; 375/354; 375/362

(58) Field of Classification Search ...................... None
See application file for complete search history.

(56) References Cited

U.S. PATENT DOCUMENTS

| 6,667,645 | B1 * | 12/2003 | Fletcher et al. ............. 327/200 |
| 6,995,554 | B2 * | 2/2006 | Loke et al. ............... 324/76.54 |
| 7,174,475 | B2 * | 2/2007 | Lee et al. ................... 713/503 |
| 2006/0020836 | A1 | 1/2006 | Oikawa |

2006/0288248 A1* 12/2006 Yamaguchi .................. 713/400

FOREIGN PATENT DOCUMENTS

JP 2000-347764 12/2000

OTHER PUBLICATIONS

U.S. Appl. No. 11/373,113, filed Mar. 13, 2006, Oikawa.
Ian A. Young, et al., "A PLL Clock Generator with 5 to 110 MHz of Lock Range for Microprocessors", IEEE Journal of Solid-State Circuits, vol. 27, No. 11, Nov. 1992, pp. 1599-1607.

* cited by examiner

*Primary Examiner*—James K. Trujillo
(74) *Attorney, Agent, or Firm*—Oblon, Spivak, McClelland, Maier & Neustadt, P.C.

(57) ABSTRACT

A circuit according to an embodiment of the present invention comprises a first power supply region supplied with a first power supply voltage, and having a first clock distribution network, a second power supply region supplied with a second power supply voltage, and having a second clock distribution network, a PLL circuit which provides a first output signal obtained by making a phase of a reference clock signal for controlling a data input/output coincident with a phase of a clock signal at an end point of the first clock distribution network, to a start point of the first clock distribution network, and a PLL circuit which provides a second output signal obtained by making the phase of the reference clock signal coincident with a phase of a clock signal at an end point of the second clock distribution network, to a start point of the second clock distribution network.

7 Claims, 4 Drawing Sheets

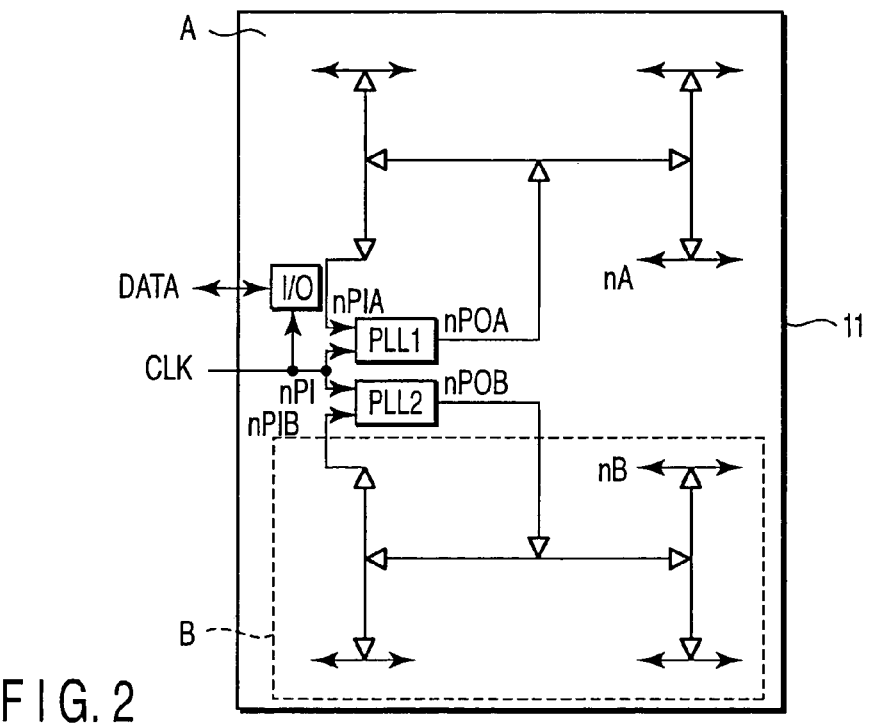
F I G. 2

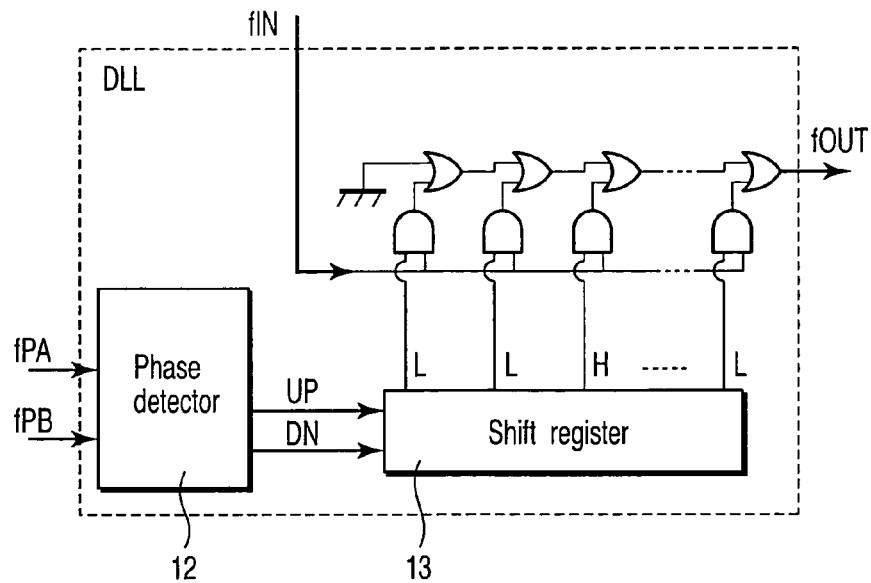
F I G. 5
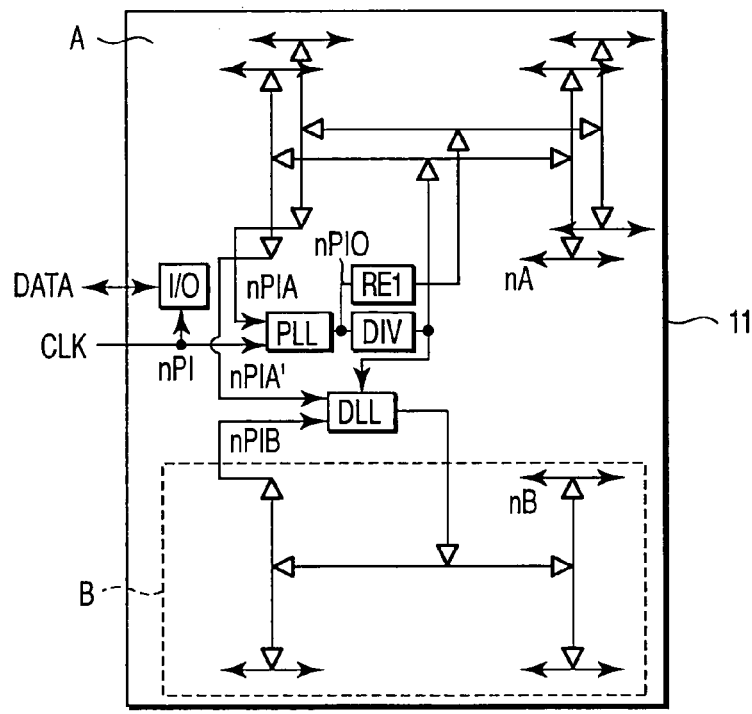
F I G. 6

SEMICONDUCTOR INTEGRATED CIRCUIT

CROSS-REFERENCE TO RELATED APPLICATIONS

This application is based upon and claims the benefit of priority from prior Japanese Patent Application No. 2004-217873, filed Jul. 26, 2004, the entire contents of which are incorporated herein by reference.

BACKGROUND OF THE INVENTION

1. Field of the Invention

The present invention relates to a synchronizer, and more particularly, to a synchronizer for use in a semiconductor integrated circuit having a plurality of power supply regions which include a power supply region in which a power supply voltage changes.

2. Description of the Related Art

Clocking is a very important technique for designing a high speed digital system. This is because, in a CPU, a clock frequency determines a data processing speed, and in an I/O bus or a memory bus, a clock frequency determines a data transfer speed.

One of the problems which must be solved to speed up a clock frequency is a clock skew.

As a clock distribution system for reducing a clock skew, there is known an H-clock tree for configuring a clock distribution network by using a combination of wiring blocks. However, it is impossible to completely eliminate a clock skew.

Therefore, a problem with a clock skew is solved by using a synchronizer such as a PLL (Phase-locked loop) circuit, and a high speed digital system is implemented.

FIG. 1 shows a synchronizer using a PLL.

With respect to a clock distribution network, all of the wiring lengths from an output terminal of the PLL circuit PLL to a plurality of terminals (such as nA, nB, for example) are equal to each other, and in a plurality of paths, a design is made so that a delay of a clock signal caused by a wiring resistance or a wiring capacity is equal to another delay.

An input/output buffer I/O operates in synchronism with a clock signal CLK (=nP1). On the other hand, an internal circuit connected to one of the plurality of terminals (end points) of the clock distribution network operates in synchronism with, for example, a clock signal CLK (=nPIA=nA=nB).

Here, the clock signal CLK (0 nPIA=nA=nB) is delayed in predetermined quantity relevant to the clock signal CLK (=nPI) due to an effect such as the wiring resistance or wiring capacity caused by the clock distribution network.

The PLL circuit PLI is used to eliminate a phase shift caused by this delay and to obtain synchronization between the clock signal CLK (=nPIA=nA=nB) and the clock signal CLK (=nPI) (refer to Jpn. Pat. Appln. KOKAI Publication Nos. 2000-347764, 9-326689, and 8-321773, and I. A. Young: "A PLL clock generator with 5 to 110 MHz of lock range for microprocessors", IEEE J. Solid-State Circuit, Volume 27, Issue 11, Nov. 1992).

In the case where a semiconductor integrated circuit 11 operates at a single power supply voltage, an internal clock signal and an external clock signal are synchronized with each other by using such a synchronizer, thereby making it possible to carry out normal operation.

As shown in an example of FIG. 1, however, in the case where the semiconductor integrated circuit 11 has a plurality of power supply regions and one of them is a power supply region in which a power supply voltage changes, a problem occurs.

For example, when the power supply voltages of the power supply regions A and B are always equal to each other, the phase of the clock signal CLK (=nPIA=nA=nB) and the phase of the clock signal (=nPI) coincide with each other.

However, assuming that the power supply voltage in the power supply region B drops, the delay quantity of the clock signal in the power supply region B becomes greater than that of the clock signal in the power supply region A. Therefore, the phase of the clock signal CLK (=nB) and the phase of the clock signal CLK (=nPI=nPIA=nA) are shifted from each other.

If the phases of the clock signals LK between the plurality of power supply regions A and B are thus shifted from each other, finally, this phase shift causes a malfunction of a whole system which includes the semiconductor integrated circuit 11.

There exists a technique for connecting power supply regions A and B each other by means of a buffer memory and eliminating a phase shift between the power supply regions A and B by using this buffer memory.

In this case, however, a general synchronizer circuit design technique becomes unavailable, and there occur problems with a complicated circuit operation, an increased circuit area, a degraded performance (increased latency), an increased development cost, and the like.

BRIEF SUMMARY OF THE INVENTION

According to an aspect of the present invention, there is provided a semiconductor integrated circuit comprising: a first power supply region supplied with a first power supply voltage, and having a first clock distribution network; a second power supply region supplied with a second power supply voltage, and having a second clock distribution network; a first phase synchronizer which provides a first output signal obtained by making a phase of a reference clock signal for controlling a data input/output coincident with a phase of a clock signal at an end point of the first clock distribution network, to a start point of the first clock distribution network; and a second phase synchronizer for providing a second output signal obtained by making the phase of the reference clock signal coincident with a phase of a clock signal at an end point of the second clock distribution network to a start point of the second clock distribution network, the semiconductor integrated circuit having a mode for changing a value of the second power supply voltage to a value which is different from a value of the first power supply voltage.

BRIEF DESCRIPTION OF THE SEVERAL VIEWS OF THE DRAWING

FIG. 2 is a circuit diagram depicting a semiconductor integrated circuit according to a first embodiment of the present invention;

FIG. 5 is a circuit diagram depicting a PLL circuit shown in FIG. 4;

FIG. 6 is circuit diagram depicting a modified example of the semiconductor integrated circuit shown in FIG. 4;

DETAILED DESCRIPTION OF THE INVENTION

A semiconductor integrated circuit of an aspect of the present invention will be described in detail with reference to the accompanying drawings.

1. EMBODIMENTS

(1) First Embodiment

FIG. 2 shows a semiconductor integrated circuit according to a first embodiment of the present invention.

A semiconductor integrated circuit (LSI) 11 includes two power supply regions A and B. Different power supply voltages are supplied to the power supply regions A and B.

For example, in the case where the power supply region B is defined as a region in which a power supply voltage changes, the power supply voltage in the power supply region B is reduced in a low power consumption mode in order to achieve low power consumption. Then, the power supply voltage is set at a value lower than the power supply voltage in the power supply region A. A voice processing portion in a system LSI using an MPEG technique or the like falls into the power supply region B.

The power supply region B may be a region in which an operating frequency changes. In this case, low power consumption can be further achieved by changing the operating frequency.

Data DATA is inputted to an input/output buffer I/O. A reference clock signal CLK (=nPI) is inputted to the input/output buffer I/O, and is inputted to PLL circuits PLL1, PLL2 which serve as synchronizers.

In the first embodiment, the PLL circuit PLL1 is allocated to be associated with the power supply region A, and the PLL circuit PLL2 is allocated to be associated with the power supply region B.

In the power supply region A, a phase of a clock signal CLK (=nPIA=nA) and a phase of the clock signal CLK (=nPI) are synchronized with each other by the PLL circuit PLL1, thus making it possible to prevent a malfunction caused by a phase shift.

In the power supply region B, a phase of a clock signal CLK (=nPIB=nB) and a phase of the clock signal CLK (=nPI) are synchronized with each other by the PLL circuit PLL2, thus making it possible to prevent a malfunction caused by a phase shift. A synchronizing function caused by the PLL circuit PLL2 is maintained even when the power supply voltage in the power supply region B changes.

Therefore, as a result, irrespective of types of the power supply regions A and B (irrespective of whether or not a power supply voltage changes), synchronization of the clock signal CLK can be always obtained at all the terminals (end points) of the clock distribution network.

(2) Second Embodiment

Figure 1:
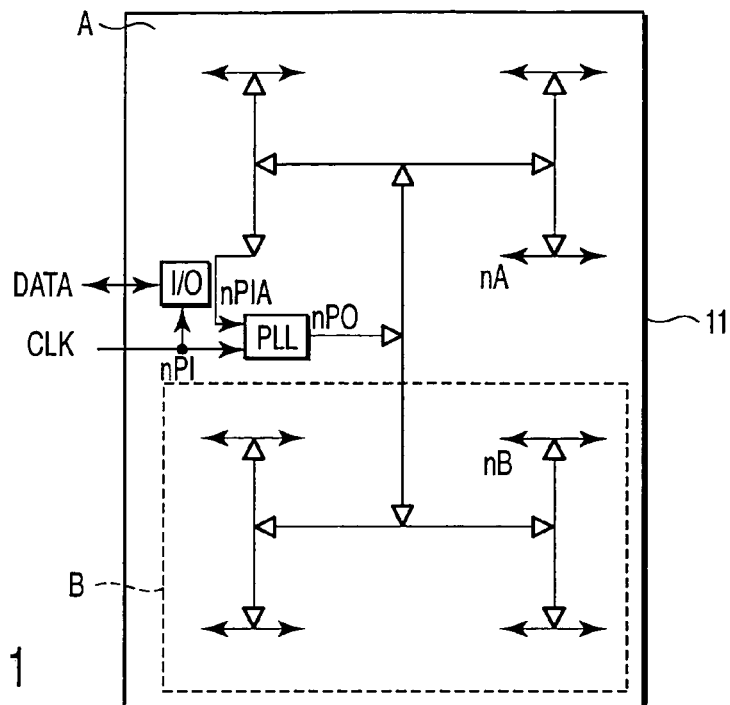
FIG. 1 is a circuit diagram depicting a conventional semiconductor integrated circuit.
Figure 3:
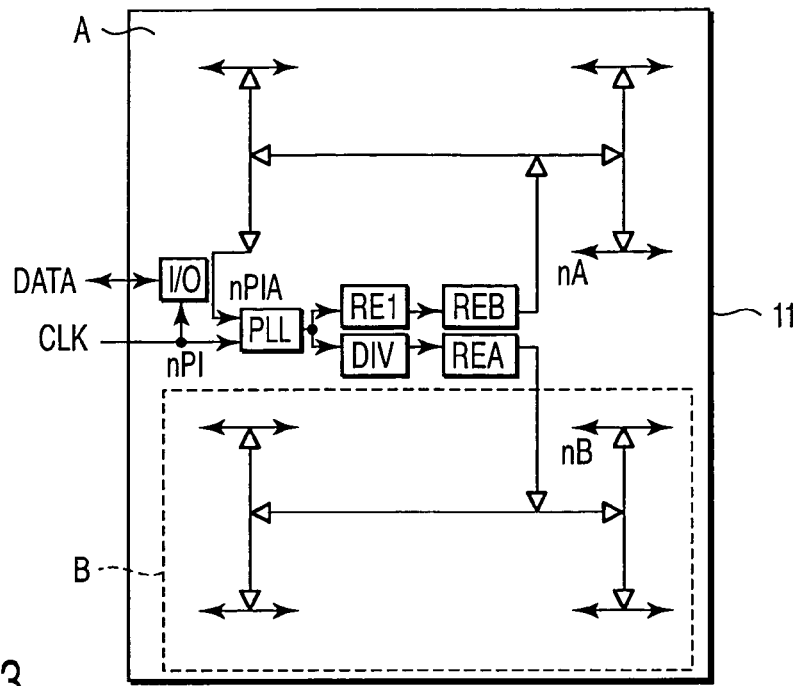
FIG. 3 is a circuit diagram depicting a semiconductor integrated circuit according to a second embodiment of the present invention.

FIG. 3 shows a semiconductor integrated circuit according to a second embodiment of the present invention.

A semiconductor integrated circuit (LSI) 11 includes two power supply regions A and B. Different power supply voltages are supplied to the power supply regions A and B. For example, as in the first embodiment, in a low power consumption mode, the power supply voltage in the power supply region B is set at a value lower than that in the power supply region A.

Data DATA is inputted to an input/output buffer I/O. A reference clock signal CLK (=nPI) is inputted to the input/output buffer I/O, and is inputted to a PLL circuit PLL which serves as a synchronizer.

In the second embodiment, an output terminal of the PLL circuit PLL is connected to a distant end (start point) of the clock distribution network in the power supply region A via delay circuits RE1, REB. In addition, this output terminal is connected to a distal end (start point) of the clock distribution network in the power supply region B via a divider DIV and a delay circuit REA.

The divider DIV has a function for setting to 1/N (where N is a natural number) a frequency of a clock signal CLK outputted from the PLL circuit PLL. The delay circuit RE1 is provided as a circuit which simulates a time required for the clock signal CLK to pass through the divider DIV. This divider has a delay time equal to that of another one.

The delay circuit REA is provided as a circuit which simulates a time required for the clock signal CLK to proceed from an output terminal of the delay circuit REB (from a distal end of the clock distribution network in the power supply region A) to a terminal (for example, nA) of the clock distribution network in the power supply region A. This delay circuit has a delay time equal to that from the distal end (start point) to the terminal (end point) of the clock distribution network in the power supply region A.

The power supply voltage of the delay circuit REA is defined as that in the power supply region A. That is, the same power supply voltage is supplied to the power supply region A and the delay circuit REA.

The delay circuit REB is provided as a circuit which simulates a time required for the clock signal CLK to proceed from an output terminal of the delay circuit REA (from a distal end of the clock distribution network in the power supply region B) to a terminal (for example, nB) of the clock distribution network in the power supply region B. This delay circuit has a delay time equal to that from the distal end (start point) to the terminal (end point) of the clock distribution network in the power supply region B.

The power supply voltage of the delay circuit REB is defined as that in the power supply region B. That is, the same power supply voltage is supplied to the power supply region B and the delay circuit REB. Thus, if the power supply voltage in the power supply region B changes, the power supply voltage of the delay circuit REB also changes at the same time.

In the power supply region A, a phase of a clock signal CLK (=nPIA=nA) and a phase of the clock signal CLK (=nPI) are synchronized with each other by the PLL circuit PLL, thus making it possible to prevent a malfunction caused by a phase shift.

In the power supply region B, a phase of a clock signal CLK (=nPIB=nB) and a phase of the clock signal CLK (=nPI) are synchronized with each other by the PLL circuit PLL, thus making it possible to prevent a malfunction caused by a phase shift.

Accordingly, when the power supply voltages in the power supply regions A and B are equal to each other, synchronization of the clock CLK can be always obtained at all the terminals of the clock distribution network.

In addition, when the power supply voltage in the power supply region B is changed, the power supply voltage of the delay circuit REB is also changed at the same time. Thus, if a change occurs with a propagation speed of the clock signal CLK in the power supply region B due to a change of the power voltage, the propagation speed of the clock signal CLK in the delay circuit REB also changes concurrently.

Therefore, even if the power supply voltages in the power supply voltages A and B are different from each other, synchronization of the clock CLK can be obtained at all the terminals of the clock distribution network.

(3) Third Embodiment

Figure 4:
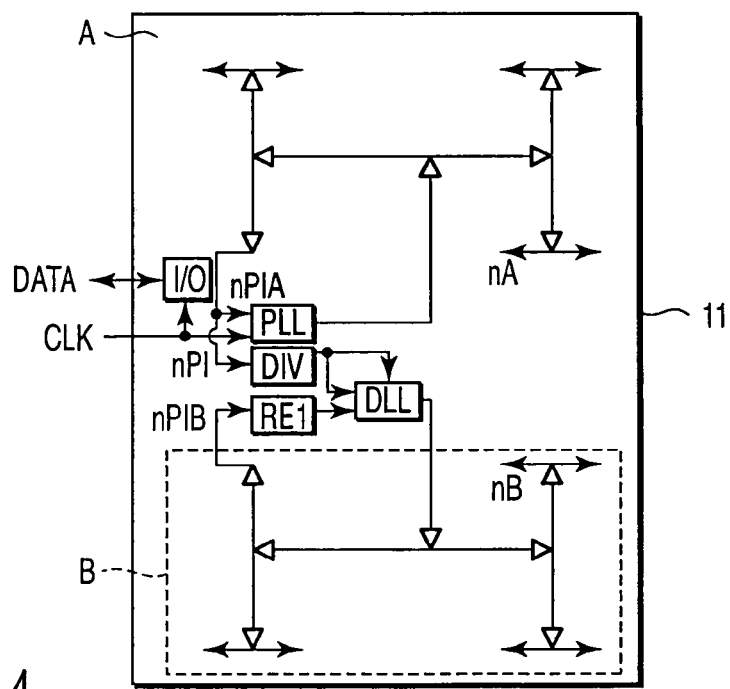
FIG. 4 is a circuit diagram depicting a semiconductor integrated circuit according to a third embodiment of the present invention.

FIG. 4 shows a semiconductor integrated circuit according to a third embodiment of the present invention.

A semiconductor integrated circuit (LSI) 11 includes two power supply regions A and B. Different power supply voltages are supplied to the power supply regions A and B. For example, as in the first embodiment, in a low power consumption mode, the power supply voltage in the power supply region B is set at a value lower than that in the power supply region A.

Data DATA is inputted to an input/output buffer I//O. A reference clock signal CLK (=nPI) is inputted to the input/output buffer I/O, and is inputted to the PLL circuit PLL serving as a synchronizer.

In the third embodiment, an output terminal of the PLL circuit PLL is connected to a distal end (start point) of the clock distribution network in the power supply region A.

A terminal (for example, nPIA (=pA)) of the clock distribution network in the power supply region A is connected to an input terminal of the PLL circuit PLL. In addition, this terminal is connected to an input terminal of a DLL (Delay Locked Loop) circuit DLL which serves as a synchronizer via a divider DIV.

An output terminal of the DLL circuit DLL is connected to a distal end (start point) of the clock distribution network in the power supply region B. A terminal (for example, nPIB (=nB)) of the clock distribution network in the power supply region B is connected to the input terminal of the DLL circuit DLL via a delay circuit RE1.

The divider DIV has a function for setting to 1/N (where N is a natural number) a frequency of an input clock signal CLK. The delay circuit RE1 is provided as a circuit which simulates a time required for the clock signal CLK to pass through the divider DIV.

In the power supply region A, a phase of a clock signal CLK (=nPIA=nA) and a phase of the clock signal CLK (=nPI) are synchronized with each other by the PLL circuit PLL, thus making it possible to prevent a malfunction caused by a phase shift.

In the power supply region B, a phase of a clock signal CLK (=nPIB=nB) and a phase of the clock signal CLK (=nPI) are synchronized with each other by the PLL circuit PLL, thus making it possible to prevent a malfunction caused by a phase shift.

Therefore, as a result, irrespective of types of the power supply regions A and B (irrespective of whether or not a power supply voltage changes), synchronization of the clock signal CLK can be always obtained at all the terminals of the clock distribution network.

FIG. 5 shows an example of the DLL circuit.

The DLL circuit DLL has a function for delaying an input signal fIN by a delay time determined depending on a phase difference between two input signals fPA and fPB, and outputting the delayed signal as an output signal fOUT.

The input signals fPA and fIN correspond to the clock signals nPIA of FIG. 4, and the input signal fPB corresponds to the clock signal nPIB of FIG. 4.

A phase detector 12 detects a phase difference between the input signals fPA and fPB, and controls a shift register 13 by way of control signals UP, DN according to the phase difference. One of a plurality of output signals of the shift register 13 falls into "H". The delay circuit in the DLL circuit DLL is composed of an AND gate circuit and an OR gate circuit, and a path of the input signal fIN is determined by an output signal of the shift register 13.

FIG. 6 shows a modified example of the semiconductor integrated circuit shown in FIG. 4.

In this example, an input signal of the DLL circuit DLL is different from another one, as compared with an example of FIG. 4. That is, the divider DIV is allocated immediately after the PLL circuit PLL; the output signal of the divider DIV is provided to the distal end of the clock distribution network in the power supply region A; and the input signal fIN of the DLL circuit DLL (refer to FIG. 5) is provided to the DLL circuit DLL.

In addition, in this example, the clock distribution network is allocated so that a phase difference (delay) between clock signals nPIO and nPIB and a phase difference (delay) between clock signals nPIO and nPIA' are equal to each other.

In the example of FIG. 4, at least a time interval for 1 clock (for 1 cycle) of the clock signals nPIA, nPIB is required in order to synchronize the clock signals nPIA, nPIB with each other. However, in an example of FIG. 6, the clock signals nPIA, nPIB can be synchronized with each other within a shorter time interval than that for 1 clock of the clock signals nPIA, nPIB.

Specifically, the phase difference (delay) between the clock signals nPIO, nPIB and the phase difference (delay) between the clock signals nPIO, nPIA' are equalized to each other by adjusting a delay quantity of the DLL circuit DLL. In addition, synchronization of the clock signal nPI and the clock signal nPIA (=nPIA', nPIB) is obtained by the PLL circuit PLL.

The input signals fPA, fPB (refer to FIG. 5) of the DLL circuit DLL correspond to the clock signals nPIA', nPIB at the terminal of the clock distribution networks of the power supply regions A and B.

In such a configuration as well, irrespective of types of the power supply regions A and B (irrespective of whether or not a power supply voltage changes), synchronization of the clock signals CLK can be always obtained at all the terminals of the clock distribution network.

(4) Fourth Embodiment

Figure 7:
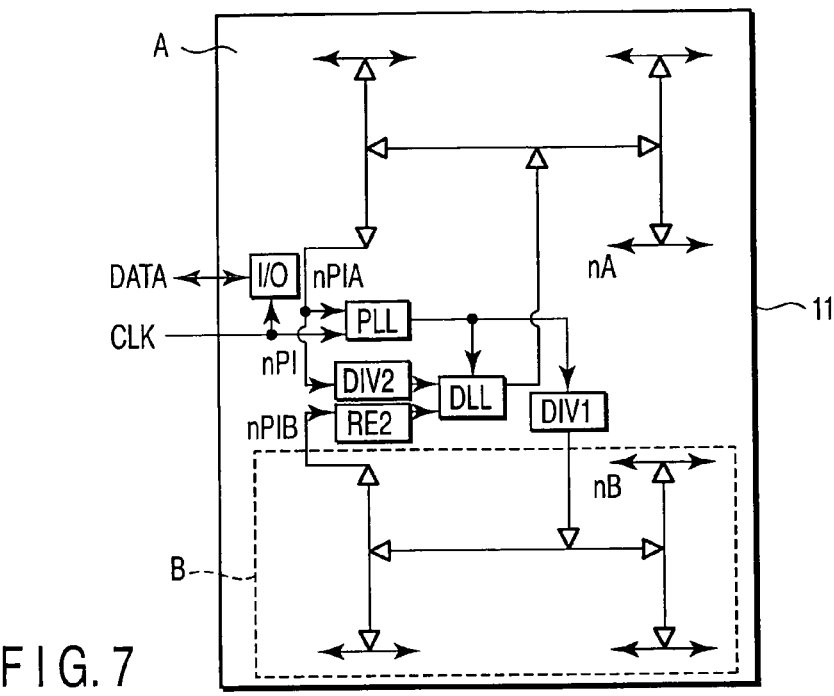
FIG. 7 is a circuit diagram depicting a semiconductor integrated circuit according to a fourth embodiment of the present invention.

FIG. 7 shows a semiconductor integrated circuit according to a fourth embodiment of the present invention.

A semiconductor integrated circuit (LSI) 11 includes two power supply regions A and B. Different power supply voltages are supplied to the power supply regions A and B. For example, as in the first embodiment, in a low power consumption mode, the power supply voltage in the power supply region B is set at a value lower than that in the power supply region A.

Data DATA is inputted to an input/output buffer I//O. A reference clock signal CLK (=nPI) is inputted to the input/output buffer I/O, and is inputted to a PLL circuit PLL which serves as a synchronizer.

In the fourth embodiment, an output terminal of the PLL circuit PLL is connected to an input terminal of a DLL (Delay Locked Loop) circuit DLL which serves as a synchronizer. In addition, this output terminal is connected to a distal end (start point) of the clock distribution network in the power supply region B via a divider DIV1.

Further, an output terminal of the DLL circuit DLL is connected to a distal end (start point) of the clock distribution network in the power supply region A. A terminal (for example, nPIA (=nA) of the clock distribution network in the power supply region A is connected to an input terminal of the PLL circuit PLL. In addition, this terminal is connected to the input terminal of the DLL circuit DLL via a divider DIV2. A terminal (for example, nPIB (=nB)) of the clock distribution network in the power supply region B is connected to the input terminal of the DLL circuit DLL via a delay circuit RE2.

The divider DIV1 has a function for setting to 1/N (where N is a natural number) a frequency of an input clock signal CLK. The divider DIV2 has a function for setting to 1/M (where M is a natural number) a frequency of an input clock signal CLK.

In the fourth embodiment, when N=M, a dividing rate of the divider DIV1 and that of the divider DIV2 are set to be equal to each other.

The delay circuit RE2 is provided as a circuit which simulates a time required for the clock signal CLK to pass through the divider DIV2. This circuit has a delay time equal to that of the divider DIV2.

The DLL circuit DLL configured in FIG. 5 can be used. In this case, an input signal fPA of FIG. 5 corresponds to an output signal of the divider DIV2; fPB of FIG. 5 corresponds to an output signal of the delay circuit RE2; and an input signal fIN of FIG. 5 corresponds to an output of the PLL circuit PLL.

The DLL circuit DLL has a function for delaying the input signal fIN by a delay time determined depending on a phase difference between the two input signals fPA and fPB, and outputting the delayed signal as an output signal fOUT.

In the fourth embodiment, a phase of a clock signal CLK (=nPIA=nA) and a phase of the clock signal CLK (=nPI) are synchronized with each other by the PLL circuit PLL. In addition, a phase of the clock signal CLK (=nPIA=nA) and a phase of a clock signal CLK (=nPIB=nB) are synchronized with each other by the DLL circuit DLL.

Therefore, as a result, irrespective of types of the power supply regions A and B (irrespective of whether or not a power supply voltage changes), synchronization of the clock signal CLK can be always obtained at all the terminals (end points) of the clock distribution network.

(5) Fifth Embodiment

A fifth embodiment relates to a configuration of a DLL circuit.

The DLL circuit has a function for delaying an input signal fIN by a delay time determined depending on a phase difference between two input signals fPA and fPB, and outputting the delayed signal as an output signal fOUT.

However, the performance of the DLL circuit, i.e., the settings (maximum value or minimum value) of the delay time caused by the DLL circuit is limited. Therefore, for example, if a phase difference between two input signals fPA and fPB is excessively large, it becomes impossible to determine a delay time in conformity with this phase difference.

As a general method for avoiding such a circumstance, there is known a method for providing a state machine and monitoring a delay time caused by a DLL circuit by means of this state machine. However, there is a problem that a circuit configuration, a control method and the like become complicated.

Therefore, in the fifth embodiment, a DLL circuit with its good traceability which is always capable of determining a delay time in conformity with a phase difference between input signals fPA and fPB is proposed with a simple configuration.

Figure 8:
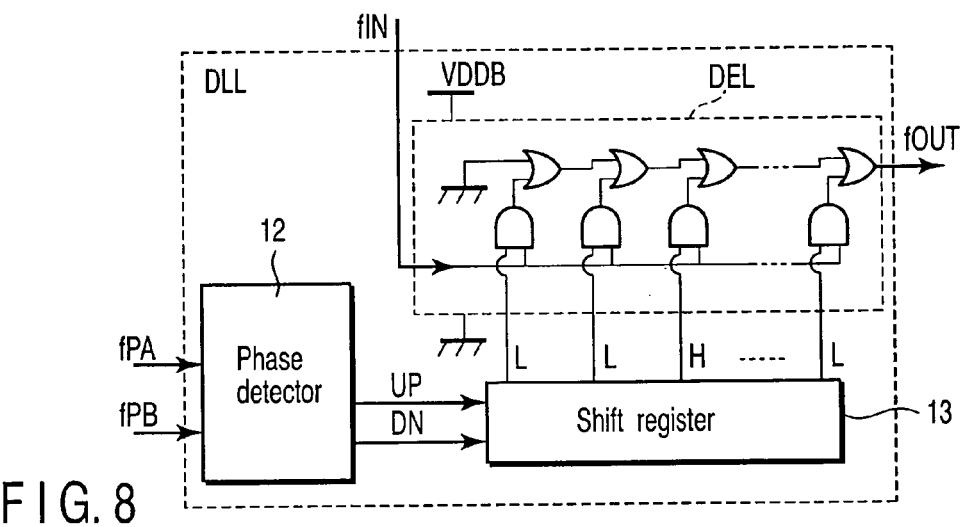
FIG. 8 is a circuit diagram depicting a DLL circuit according to a fifth embodiment of the present invention.

FIG. 8 shows a DLL circuit according to the fifth embodiment.

A phase detector 12 detects a phase difference between input signals fPA and fPB, and controls a shift register 13 by way of control signals UP, DN according to the phase difference. One of a plurality of output signals of the shift register 13 falls into "H". The delay circuit DEL in the DLL circuit DLL is composed of an AND gate circuit and an OR gate circuit, and a path of the input signal fIN is determined by the output signal of the shift register 13.

In the fifth embodiment, a power supply voltage VDDB of the delay circuit DEL in the DLL circuit DLL is set at a power supply voltage in the power supply region B.

Therefore, if the power supply voltage in the power supply region B changes, the power supply voltage VDDB of the delay circuit DEL in the DLL circuit DLL also changes in the same way as that in the power supply region B.

In this manner, the power supply voltage VDDB of the delay circuit DEL in the DLL circuit DLL is changed according to a change of the power supply voltage in the power supply region B, whereby the phases of the clock signals CLK in the power supply regions A and B change altogether in the same direction. Therefore, the phase difference between the input signals fPA and fPB is not excessively large.

Namely, a DLL circuit with its good traceability which is always capable of determining a delay time in conformity with the phase difference between the input signals fPA and fPB can be proposed with a simple configuration. In addition, since traceability caused by the shift register is improved, the precision of synchronization of the clock signals CLK can be improved.

The DLL circuit according to the fifth embodiment can be applied to, for example, the semiconductor integrated circuit according to the fourth embodiment (FIG. 7).

In this case, the input signal fPA corresponds to an output signal of the divider DIV2 of FIG. 7; the input signal fPB corresponds to an output signal of the delay circuit RE2 of FIG. 7; and the input signal fIN corresponds to an output signal of the PLL circuit PLL of FIG. 7.

2. APPLICATION EXAMPLE

A description will be given by way of example of a semiconductor integrated circuit (LSI) having a plurality of power supply regions which include a power supply region in which a power supply voltage changes.

Such semiconductor integrated circuits include a variety of LSIs such as a system LSI using an MPEG technique. As one of these LSIs, a DSP (Digital Signal Processor) for controlling an image is exemplified.

Figure 9:
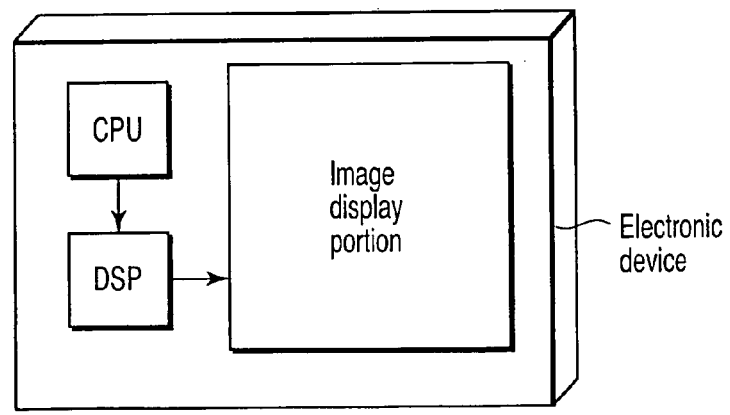
FIG. 9 is a view showing an application example of a semiconductor integrated circuit according to embodiments of the present invention.

FIG. 9 shows an electronic device having an image display portion.

The DSP controls the size or quality of an image displayed on the image display portion based on a command from a CPU.

For example, when a small image is displayed on the image display portion or when a poor image quality is allowable (when a low density is allowable), the power supply voltage of an image control region (power supply region) in the DSP is reduced. In addition, when an image displayed on the image display portion must be processed at a high speed or when a high quality image is required, the power supply voltage of the image control region (power supply region) in the DSP is increased.

3. OTHERS

By using the synchronizer according to the embodiments of the present invention, the phases of clock signals in a plurality of power supply regions can be always made coincident with each other in a semiconductor integrated circuit comprising a plurality of power supply regions which include a power supply region in which a power supply voltage changes, such that power supply voltages are different from each other between the plurality of power supply regions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit comprising:
   a first power supply region supplied with a first power supply voltage, and having a first clock distribution network;
   a second power supply region supplied with a second power supply voltage, and having a second clock distribution network;
   a first phase synchronizer which provides a first output signal obtained by making a phase of a reference clock signal for controlling a data input/output coincident with a phase of a clock signal at an end point of the first clock distribution network, to a start point of the second clock distribution network; and
   a second phase synchronizer which provides a second output signal obtained by making the phase of the clock signal at the end point of the first clock distribution network coincident with a phase of a clock signal at an end point of the second clock distribution network, to a start point of the first clock distribution network,
   wherein the semiconductor integrated circuit has a mode for changing a value of the second power supply voltage to a value which is different from a value of the first power supply voltage.

2. The semiconductor integrated circuit according to claim 1, further comprising a first divider connected between the first phase synchronizer and the start point of the second clock distribution network.

3. The semiconductor integrated circuit according to claim 2, further comprising:
   a second divider connected between the end point of the first clock distribution network and the second phase synchronizer; and
   a delay circuit connected between the end point of the second clock distribution network and the second phase synchronizer, and having a delay time which is equal to a delay time of the divider.

4. The semiconductor integrated circuit according to claim 3, wherein a dividing rate of the first divider is equal to a dividing rate of the second divider.

5. The semiconductor integrated circuit according to claim 3, wherein the second phase synchronizer has a function for delaying the first output signal by a delay time according to a phase difference between the phase of the clock signal at the end point of the first clock distribution network and the phase of the clock signal at the end point of the second clock distribution network, and outputting the delayed signal as the second output signal.

6. The semiconductor integrated circuit according to claim 5, wherein the delay circuit which generates a delay time is driven by the second power supply voltage.

7. The semiconductor integrated circuit according to claim 1, wherein the first phase synchronizer is a PLL circuit, and the second phase synchronizer is a DLL circuit.

* * * * *